United States Patent
Müller et al.

(10) Patent No.: US 10,138,328 B2
(45) Date of Patent: Nov. 27, 2018

(54) METHOD FOR PRODUCING POLYETHER CARBONATE POLYOLS

(71) Applicant: Covestro Deutschland AG, Leverkusen (DE)

(72) Inventors: Thomas Ernst Müller, Aachen (DE); Christoph Gürtler, Köln (DE); Matthias Wohak, Dormagen (DE); Jörg Hofmann, Krefeld (DE); Carlson Torren, Newark, DE (US)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/527,369

(22) PCT Filed: Nov. 16, 2015

(86) PCT No.: PCT/EP2015/076711
§ 371 (c)(1),
(2) Date: May 17, 2017

(87) PCT Pub. No.: WO2016/079065
PCT Pub. Date: May 26, 2016

(65) Prior Publication Data
US 2017/0321005 A1 Nov. 9, 2017

(30) Foreign Application Priority Data

Nov. 18, 2014 (EP) ..................... 14193601

(51) Int. Cl.
*C08G 64/34* (2006.01)
*C08G 65/26* (2006.01)

(52) U.S. Cl.
CPC ......... *C08G 65/2663* (2013.01); *C08G 64/34* (2013.01); *C08G 65/2603* (2013.01); *C08G 65/2696* (2013.01)

(58) Field of Classification Search
CPC ................................ C08G 64/34; C08G 65/26
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 4,826,953 A | 5/1989 | Kuyper et al. |
| 5,158,922 A | 10/1992 | Hinney et al. |
| 5,470,813 A | 11/1995 | Le-Khac |
| 5,536,883 A | 7/1996 | Le-Khac |
| 5,637,673 A | 6/1997 | Le-Khac |
| 5,714,428 A | 2/1998 | Le-Khac |
| 5,789,626 A | 8/1998 | Le-Khac |
| 6,018,017 A | 1/2000 | Le-Khac |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 7,671,228 B2 | 3/2010 | Hinz et al. |
| 8,324,419 B2 | 12/2012 | Mijolovic et al. |
| 9,249,259 B2 | 2/2016 | Müller et al. |
| 9,273,183 B2 | 3/2016 | Müller et al. |
| 2010/0048935 A1 | 2/2010 | Mijolovic et al. |
| 2015/0259475 A1 | 9/2015 | Müller et al. |
| 2016/0257776 A1 | 9/2016 | Jacobs et al. |
| 2017/0137569 A1* | 5/2017 | Hofmann ............... C08G 64/34 |

FOREIGN PATENT DOCUMENTS

| | | | |
|---|---|---|---|
| JP | 04145123 A | 5/1992 | |
| WO | 03029325 A1 | 4/2003 | |
| WO | WO-2014033070 A1 * | 3/2014 | ............. C08G 64/34 |

OTHER PUBLICATIONS

Inoue et al; Die Makromolekulare Chemie 130; "Copolymerization of Carbon Dioxide and Epoxide with Organometallic Compounds"; (Jul. 1969); (Nr. 3170); pp. 210-220; Tokyo, Japan.

* cited by examiner

Primary Examiner — Sun Jae Yoo
(74) Attorney, Agent, or Firm — N. Denise Brown

(57) ABSTRACT

The invention relates to a method for producing polyether carbonate polyols, comprising the step of reacting alkylene oxide with carbon dioxide in the presence of an h-functional starter compound and double metal cyanide catalyst. The invention is characterized in that the method comprises the following steps: (α) optionally, pre-treating the double metal cyanide catalyst (DMC catalyst) at a temperature of 50 to 200° C. and/or reduced pressure (absolute) of 10 mbar to 800 mbar; (β) bringing the double metal cyanide catalyst in contact with suspension means, and furthermore, with alkylene oxide in the first reactor thus obtaining a first reaction mixture, and (γ) continuous added dosing of the first reaction mixture, alkaline oxide, and carbon oxide, and optionally, h-functional starter compound in a second reactor, wherein in at least one of the steps (β) or (γ), at least one h-functional starter compound is used, and wherein reaction products formed in step (γ) are continuously removed from the second reactor.

15 Claims, No Drawings

METHOD FOR PRODUCING POLYETHER CARBONATE POLYOLS

CROSS-REFERENCE TO RELATED APPLICATIONS

This Application is a National Phase Application of PCT/EP2015/076711, filed Nov. 16, 2015, which claims priority to European Application No. 14193601.3 filed Nov. 18, 2014, each of which is being incorporated herein by reference.

FIELD

The present invention relates to a process for preparing polyether carbonate polyols from one or more H-functional starter compounds, one or more alkylene oxides and carbon dioxide in the presence of a double metal cyanide (DMC) catalyst activated in a preceding step. It further relates to polyether carbonate polyols obtained by the process according to the invention.

BACKGROUND

As well as having a tailored functionality, modern plastics are also intended to do increased justice to environmental concerns. As well as by a general optimization of preparation processes, this can also be achieved through the use of greenhouse gases, such as carbon dioxide, as building block for the synthesis of polymers. Accordingly, for example, a better environmental balance for the process can be obtained overall via the fixing of carbon dioxide. This path is being followed in the area of the production of polyether carbonates, and has been a topic of intense research for more than 40 years (e.g., Inoue et al., Copolymerization of Carbon Dioxide and Alkylenoxide with Organometallic Compounds; Die Makromolekulare Chemie 130, 210-220, 1969). In one possible preparation variant, polyether carbonate polyols are obtained by a catalytic reaction of alkylene oxides and carbon dioxide in the presence of H-functional starter compounds ("starters"). A general reaction equation for this is:

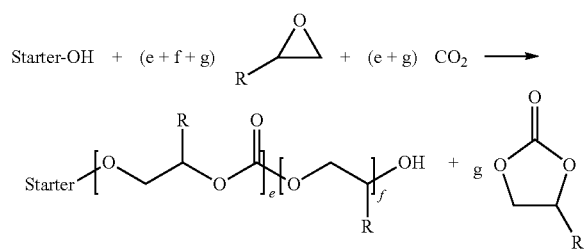

A further product, in this case an unwanted by-product, arising alongside the polyether carbonate polyol is a cyclic carbonate (for example, for R=CH$_3$, propylene carbonate).

The literature describes a number of different preparation variants. For example, US 2010/0048935 A1 describes a process for preparing polyether carbonate polyols by reacting alkylene oxides and carbon dioxide with H-functional starter compounds by means of a DMC catalyst, in which one or more starter compounds are initially charged in a reactor and, in addition, one or more starter compounds are metered in continuously over the course of the reaction. One possible alkylene oxide mentioned is epoxidized soya oil. However, the reactivity of these oxirane rings is low, since they are within a chain and are highly sterically shielded. Therefore, the epoxidized soya oil is converted more slowly than standard monomers, such as propylene oxide, and accumulates in the reaction mixture. Since epoxidized soya oil, moreover, is a mixture of polyepoxidized compounds, controlled construction of defined polymer architectures is impossible.

WO 2006/103213 A1, in contrast, describes a process for preparing polyether carbonate polyols that features improved incorporation of CO$_2$ into the polyether carbonate polyol, using a multimetal cyanide catalyst. The document discloses the presence of an H-functional starter, an alkylene oxide, and carbon dioxide in the presence of the multimetal cyanide catalyst in a reactor. The document further discloses the presence of a CO$_2$-philic substance or of CO$_2$-philic substituents. The CO$_2$-philic substance or the CO$_2$-philic substituent is intended to facilitate the incorporation of CO$_2$ into the polyether carbonate polyol and so to reduce the formation of cyclic alkylene carbonates, such as propylene carbonate, for example, which represent unwanted by-products. The CO$_2$-philic substance has to be removed from the reaction mixture obtained after the reaction, which leads to increased time demands and costs.

WO 2012/130760 A1 mentions the use of higher-functionality alcohols as starter in the reaction of epoxides with CO$_2$ to give polyether carbonates under double metal cyanide (DMC) catalysis.

EP 0 222 453 A2 discloses a process for preparing polycarbonates from alkylene oxides and carbon dioxide using a catalyst system composed of DMC catalyst and a cocatalyst such as zinc sulfate. This polymerization is initiated here by one-off contacting of a portion of the alkylene oxide with the catalyst system. Only thereafter are the remaining amount of alkylene oxide and the carbon dioxide metered in simultaneously. The amount of 60% by weight of alkylene oxide relative to the H-functional starter compound, as specified in EP 0 222 453 A2 for the activation step in examples 1 to 7, is high and has the disadvantage that this constitutes a safety risk for industrial scale applications because of the high exothermicity of the homopolymerization of alkylene oxides.

WO 2003/029325 A1 discloses a process for preparing high molecular weight aliphatic polyether carbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final CO$_2$ pressures of up to 150 bar place very high demands on the reactor and on safety. Even the extremely high pressure of 150 bar results in incorporation of only about 33% by weight of CO$_2$ up to a maximum of 42% by weight of CO$_2$. The accompanying examples describe the use of a solvent (toluene) which has to be removed again by thermal means after the reaction, thus resulting in increased time and cost demands. Furthermore, the polymers, with a polydispersity of 2.7 or more, have a very broad molar mass distribution.

For the conversion of the epoxide/CO$_2$ copolymerization to the industrial scale, there is a need for a method for performing the reaction in a continuously operated plant that does not have disadvantages of the prior art, for example a long activation time and a significantly lower catalyst activity in the presence of CO$_2$ and short-chain starter compounds and, following from this, a low mean reaction rate and a long residence time of the reaction mixture in the reactor (corresponding to a low specific product output).

A high specific product output is understood in the context of the invention to mean a high mean reaction rate of the addition of epoxides and $CO_2$ onto H-functional starter compounds ("copolymerization"). The specific product output of a reactor or, more generally, of a process can be determined as the quotient of the mass flow rate of alkylene oxide used and starter compound multiplied by the conversion of alkylene oxide obtained and the volume of the liquid phase in the reactor in question. The specific product output is reported in $kg/(m^3 \cdot h)$.

The problem addressed was therefore that of providing a process for preparing polyether carbonate polyols which features a high specific product output, and wherein the resulting polyether carbonate polyol has a narrow molar mass distribution (low polydispersity) and a minimum viscosity.

SUMMARY

It has been found that, surprisingly, the problem addressed by the invention is solved by the use of DMC catalysts which are activated in a preceding step in the presence of suspension medium and/or one or more H-functional starter compounds. These activated DMC catalysts are fed continuously to the polymerization reactor together with suspension medium and/or one or more H-functional starter compounds. With the catalysts thus activated, it is possible to achieve a particularly high specific product output in the copolymerization of epoxides and $CO_2$. The polyether carbonate polyols obtained by the process of the invention feature a narrow molar mass distribution, a small proportion of relatively long polymer chains in the product mixture and a surprisingly low viscosity.

It has also been found that, in a continuous process in which DMC catalysts which are activated with propylene oxide in the absence of carbon dioxide are used, wherein short-chain starter compounds are initially charged or metered in semicontinuously ("CAOS mode), polyether carbonate polyols are obtained with particularly high specific product output.

The present invention therefore provides a process for preparing polyether carbonate polyols, comprising the step of reaction of alkylene oxide with carbon dioxide in the presence of an H-functional starter compound and double metal cyanide catalyst, wherein the process comprises the following steps:

(α) optionally pretreating the double metal cyanide catalyst (DMC catalyst) at a temperature of 50 to 200° C. and/or reduced pressure (absolute) of 10 mbar to 800 mbar, preferably pretreating the DMC catalyst in a mixture with suspension medium at a temperature of 50 to 200° C. and/or reduced pressure (absolute) of 10 mbar to 800 mbar and optionally while passing an inert gas through the mixture of DMC catalyst and suspension medium ("drying" step), (β) contacting the double metal cyanide catalyst and suspension medium with alkylene oxide in a first reactor to obtain a first reaction mixture ("activation" step); and (γ) continuously adding the first reaction mixture, alkylene oxide and carbon dioxide and optionally H-functional starter compound to a second reactor ("polymerization" step), wherein at least one H-functional starter compound is added at least in one of steps (β) and (γ) and wherein reaction products formed in step (γ) are withdrawn continuously from the second reactor.

DETAILED DESCRIPTION

The use of an activated catalyst as per the process of the invention leads to a reduced alkylene oxide concentration in the reaction mixture compared to a process regime using a non-activated catalyst. The reduced alkylene oxide concentration gives rise to elevated intrinsic process reliability and enables shorter further reaction times in downstream processing steps.

Activation in the context of this invention (step (β)) especially refers to a step in which a portion of alkylene oxide, suspension medium and optionally $CO_2$ are added to the DMC catalyst. Optionally, the portion of the alkylene oxide can be added in two or more individual steps.

The activation step may generally be preceded by a step for drying the DMC catalyst and optionally the suspension medium at elevated temperature and/or reduced pressure, optionally with passage of an inert gas through the reaction mixture (step (α)).

If reference is made in the context of the present invention to "an alkylene oxide", "an H-functional starter compound", etc., this is not intended to stipulate the singular, but is the use of an indefinite article. The invention therefore also includes mixtures of alkylene oxides, and mixtures of H-functional starter compounds.

A characteristic feature of the polyether carbonate polyols prepared according to the invention is that they also contain ether groups between the carbonate groups. In relation to formula (Ia), this means that the ratio of e/f is preferably from 2:1 to 1:20, more preferably from 1.5:1 to 1:10. Carbonate groups and ether groups are distributed statistically along the polymer chain.

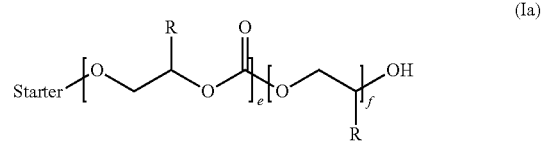

(Ia)

Suitable alkylene oxides (epoxides) are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, singly epoxidized fats in the form of mono-, di-, and triglycerides, singly epoxidized fatty acids, $C_1$-$C_{24}$ esters of singly epoxidized fatty acids, singly epoxidized derivatives of glycidol such as, for example, methyl glycidyl ether, ethyl glycidyl ether, 2-ethylhexyl glycidyl ether, allyl glycidyl ether, glycidyl methacrylate, and also epoxy-functional alkoxysilanes such as, for example, 3-glycidyloxypropyltrimethoxysilane, 3-glycidyloxypropyltriethoxysane, 3-glycidyloxypropyltripropoxysilane, 3-glycidyloxypropylmethyldimethoxysilane, 3-glycidyloxypropylethyldiethoxysilane or 3-glycidyloxypropyltriisopropoxysilane.

Suspension media in the context of the invention are H-functional starter compounds or compounds that do not contain any H-functional groups.

According to the invention, at least one H-functional starter compound is added at least in one of steps (β) and (γ). If, in step (β), the suspension medium used is an H-functional starter compound, H-functional starter compound may (but need not) be added to the second reactor in step (γ). If, in turn, in step (β), the suspension medium used is not an H-functional starter compound, an H-functional starter compound is added to the second reactor in step (γ).

As suitable H-functional starter compounds (starters) it is possible to use compounds having H atoms that are active in respect of the alkoxylation. Groups active in respect of the alkoxylation and having active hydrogen atoms are, for example, —OH, —NH$_2$ (primary amines), —NH— (secondary amines), —SH, and —CO$_2$H, preferably —OH and NH$_2$, more preferably —OH. The compounds employed as H-functional starter compound are, for example, one or more compound(s) selected from the group consisting of mono- or polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (e.g., so-called Jeffamines® from Huntsman, such as e.g. D-230, D-400, D-2000, T-403, T-3000, T-5000 or corresponding products from BASF, such as e.g. Polyetheramine D230, D400, D200, T403, T5000), polytetrahydrofurans (e.g., PolyTHF® from BASF, such as e.g. PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C$_1$-C$_{24}$ alkyl fatty acid esters which contain on average at least 2 OH groups per molecule. The C1-C24 alkyl fatty acid esters which contain on average at least 2 OH groups per molecule are, by way of example, commercial grades such as Lupranol Balance® (from BASF AG), Merginol® grades (from Hobum Oleochemicals GmbH), Sovermol® grades (from Cognis Deutschland GmbH & Co. KG), and Soyol®TM grades (from USSC Co.).

Monofunctional starter compounds used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols used may be: ethanethiol, propane-1-thiol, propane-2-thiol, butane-1-thiol, 3-methylbutane-1-thiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter compounds are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter compounds may also be selected from the substance class of the polyether polyols, especially those having a molecular weight $M_n$ in the range from 100 to 4000 g/mol. Preference is given to polyether polyols formed from repeat ethylene oxide and propylene oxide units, preferably having a proportion of 35% to 100% propylene oxide units, more preferably having a proportion of 50% to 100% propylene oxide units. These may be random copolymers, gradient copolymers, alternating copolymers or block copolymers of ethylene oxide and propylene oxide. Suitable polyether polyols formed from repeat propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are for example the Pluriol® E brands from BASF SE; suitable homopolypropylene oxides are for example the Pluriol® P brands from BASF SE; suitable mixed copolymers of ethylene oxide and propylene oxide are for example the Pluronic® PE or Pluriol® RPE brands from BASF SE.

The H-functional starter compounds may also be selected from the substance class of the polyester polyols, especially those having a molecular weight $M_n$ in the range from 200 to 4500 g/mol. Polyester polyols used are at least difunctional polyesters. Polyester polyols preferably consist of alternating acid and alcohol units. The acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol, or mixtures of the stated alcohols. Employing dihydric or polyhydric polyether polyols as the alcohol component affords polyester ether polyols which can likewise serve as starter compounds for preparation of the polyether carbonate polyols. Preference is given to using polyether polyols with $M_n$=150 to 2000 g/mol for preparation of the polyester ether polyols.

As H-functional starter compounds it is possible, furthermore, to use polycarbonate diols, more particularly those having a molecular weight $M_n$ in the range from 150 to 4500 g/mol, preferably 500 to 2500 g/mol, which are prepared, for example, by reaction of phosgene, dimethyl carbonate, diethyl carbonate or diphenyl carbonate with difunctional alcohols or polyester polyols or polyether polyols. Examples relating to polycarbonates may be found for example in EP-A 1359177. As polycarbonate diols it is possible for example to use the Desmophen® C grades from Bayer MaterialScience AG, such as Desmophen® C 1100 or Desmophen® C 2200, for example.

In a further embodiment of the invention, it is possible to use polyether carbonate polyols as H-functional starter compounds. More particularly, polyether carbonate polyols obtainable by the process of the invention described here are used. For this purpose, these polyether carbonate polyols used as H-functional starter compounds are prepared in a separate reaction step beforehand.

The H-functional starter compounds generally have an OH functionality (i.e., number of polymerization-active H atoms per molecule) of 1 to 8, preferably of 2 to 6, and more preferably of 2 to 4. The H-functional starter compounds are used either individually or as a mixture of at least two H-functional starter compounds.

Preferred H-functional starter compounds are alcohols of the general formula:

$$HO-(CH_2)_x-OH$$

where x is a number from 1 to 20, preferably an integer from 2 to 20. Examples of alcohols of the formula above are ethylene glycol, 1,4-butanediol, 1,6-hexanediol, 1,8-octanediol, 1,10-decanediol, and 1,12-dodecanediol. Further preferred H-functional starter compounds are neopentyl glycol, trimethylolpropane, glycerol, pentaerythritol, reaction products of the alcohols of the above formula with ε-caprolactone, e.g. reaction products of trimethylolpropane with ε-caprolactone, reaction products of glycerol with ε-caprolactone, and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units, and polyether carbonate polyols.

With particular preference the H-functional starter compounds are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, the polyether polyol being formed from a di- or tri-H-functional starter compound and propylene oxide or from a di- or tri-H-functional starter compound, propylene oxide, and ethylene oxide, and also di- and trifunctional polyether carbonate polyols, the polyether carbonate polyol being formed from a di- or tri-H-functional starter compound, carbon dioxide, and propylene oxide and/or ethylene oxide. The polyether polyols and polyether carbonate polyols preferably have an OH functionality of 2 to 4 and a molecular weight $M_n$ in the range from 62 to 4500 g/mol and more particularly a molecular weight $M_n$ in the range from 62 to 3000 g/mol.

Suspension media that do not contain any H-functional groups are, for example, all polar aprotic, weakly polar aprotic and nonpolar aprotic solvents, none of which contain any H-functional groups. The suspension medium used may also be a mixture of two or more of these suspension media. Mention is made by way of example at this point of the following polar aprotic solvents: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar aprotic and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In an alternative embodiment, one or more compound(s) selected from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides are as suspension medium. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2 (3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-diones, 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-di oxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-di oxan-2-one. Particular preference is given to trimethylene carbonate and neopentyl glycol carbonate.

Under the conditions of the process of the invention for the copolymerization of epoxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides used are cyclic compounds containing an anhydride group in the ring. Preferred compounds are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H, 5H)-trione, 3-ethyldihydrofuran-2,5-dione, 3-methoxydihydrofuran-2,5-di one, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

The DMC catalysts used in the process of the invention contain double metal cyanide compounds that are the reaction products of water-soluble metal salts and water-soluble metal cyanide salts.

Double metal cyanide (DMC) catalysts are known from the prior art for the homopolymerization of alkylene oxides (see, for example, U.S. Pat. No. 3,404,109, U.S. Pat. No. 3,829,505, U.S. Pat. No. 3,941,849, and U.S. Pat. No. 5,158,922). DMC catalysts, which are described in, for example, U.S. Pat. No. 5,470,813, EP-A 700 949, EP-A 743 093, EP-A 761 708, WO 97/40086 A1, WO 98/16310 A1, and WO 00/47649 A1, possess a very high activity and allow the preparation of polyether carbonate polyols at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The DMC catalysts which can be used in accordance with the invention are preferably obtained by:

(a) reacting in the first step an aqueous solution of a metal salt with the aqueous solution of a metal cyanide salt in the presence of one or more organic complex ligands, e.g. of an ether or alcohol, (b) with removal in the second step of the solid from the suspension obtained from (a), by means of known techniques (such as centrifugation or filtration), (c) with optional washing in a third step of the isolated solid with an aqueous solution of an organic complex ligand (for example by resuspending and subsequently reisolating by filtration or centrifugation), (d) with subsequent drying of the solid obtained, optionally after pulverization, at temperatures of generally 20-120° C. and at pressures of generally 0.1 mbar to standard pressure (1013 mbar), and by, in the first step or immediately after the precipitation of the double metal cyanide compound (second step), adding one or more organic complex ligands, preferably in excess (based on the double metal cyanide compound) and optionally further complex-forming components.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition of the following general formula:

$$M(X)_n$$

where M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$.

Preferably, M is $Zn^{2+}$, $Fe^{2+}$, $Co^{2+}$ or $Ni^{2+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate; n is 1 when X=sulfate, carbonate or oxalate, and n is 2 when X=halide, hydroxide, carboxylate, cyanate, thiocyanate, isocyanate, isothiocyanate or nitrate.

Likewise suitable metal salts have a composition according to the following general formula:

$$M_r(X)_3$$

where M is selected from the metal cations $Fe^{3+}$, $Al^{3+}$, $Co^{3+}$ and $Cr^{3+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate; r is 2 when X=sulfate, carbonate or oxalate, and r is 1 when X=halide, hydroxide, carboxylate, cyanate, thiocyanate, isocyanate, isothiocyanate or nitrate.

Likewise suitable metal salts have a composition according to the following general formula:

$$M(X)_s$$

where M is selected from the metal cations $Mo^{4+}$, $V^{4+}$ and $W^{4+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate; s is 2 when X=sulfate, carbonate or oxalate, and s is 4 when X=halide, hydroxide, carboxylate, cyanate, thiocyanate, isocyanate, isothiocyanate or nitrate.

Likewise suitable metal salts have a composition according to the following general formula:

$$M(X)_t$$

where M is selected from the metal cations $Mo^{6+}$ and $W^{6+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate; t is 3 when X=sulfate, carbonate or oxalate, and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have a composition of the following general formula:

$$(Y)_a M'(CN)_b (A)_c$$

where M' is selected from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), M' preferably being one or more metal cations of the group consisting of Co(II), Co(III), Fe(II), Fe(III), Cr(III), Ir(III) and Ni(II), Y is selected from one or more metal cations of the group consisting of alkali metal (i.e., $Li_+$, $Na_+$, $K_+$, $Rb^+$) and alkaline earth metal (i.e., $Be^{2+}$, $Mg^{2+}$, $Ca^{2+}$, $Ba^{2+}$), A is selected from one or more anions of the group consisting of halides (i.e., fluoride, chloride, bromide, iodide), hydroxide, sulfate, carbonate, cyanate, thiocyanate, isocyanate, isothiocyanate, carboxylate, azide, oxalate or nitrate, and a, b and c are integers, where the values of a, b and c are chosen so as to ensure electronic neutrality of the metal cyanide salt; a is preferably 1, 2, 3 or 4; b is preferably 4, 5 or 6; c preferably has a value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds which are present in the DMC catalysts useful in accordance with the invention are compounds having a composition according to the following general formula:

$$M_x[M'_{x'}(CN)_y]_z$$

in which M and M' are each as defined above and x, x', y and z are integers and are chosen so as to ensure electronic neutrality of the double metal cyanide compound.

Preferably, x=3, x'=1, y=6 and z=2, M=Zn(II), Fe(II), Co(II) or Ni(II) and M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether, and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol), and a suspension is formed which comprises the double metal cyanide compound (e.g. zinc hexacyanocobaltate), water, excess metal salt, and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the inventive catalyst) is isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, it is possible to remove, for example, water-soluble by-products such as potassium chloride from the inventive catalyst. Preferably, the amount of the organic complex ligand in the aqueous wash solution is between 40% and 80% by weight, based on the overall solution.

Optionally in the third step the aqueous wash solution is admixed with a further complex-forming component, preferably in the range between 0.5% and 5% by weight, based on the overall solution.

It is also advantageous to wash the isolated solids more than once. Preferably, in a first wash step (c-1), an aqueous solution of the organic complex ligand is used for washing (for example by resuspension and subsequent reisolation by filtration or centrifugation), in order to remove, for example, water-soluble by-products such as potassium chloride from the inventive catalyst in this way. Especially preferably, the amount of the organic complex ligand in the aqueous wash solution is between 40% and 80% by weight, based on the overall solution in the first wash step. In the further washing steps (c-2) either the first washing step is repeated once or several times, preferably from one to three times, or, preferably, a nonaqueous solution, such as a mixture or solution of organic complex ligand and further complex-forming component (preferably in the range between 0.5% and 5% by weight, based on the total amount of the wash solution of step (c-2)), is used as the wash solution, and the solid is washed with it once or more than once, preferably from one to three times.

The isolated and optionally washed solid is then dried, optionally after pulverization, at temperatures of 20-100° C. and at pressures of 0.1 mbar to standard pressure (1013 mbar).

One particularly preferred method for isolating the DMC catalysts usable in accordance with the invention from the suspension, by filtration, filtercake washing, and drying, is described in WO-A 01/80994, for example.

The present invention is described in detail hereinafter in connection with further embodiments and aspects. They can be combined in any desired manner with one another, as long as the context does not make it absolutely clear that the opposite is the case.

In one embodiment of the process of the invention, in step ((3), the double metal cyanide catalyst is further contacted with carbon dioxide.

In a further embodiment of the process of the invention, in step (β), double metal cyanide catalyst, alkylene oxide, suspension medium and/or H-functional starter compound are metered into the first reactor at least intermittently in a continuous manner.

In a further embodiment of the process of the invention, reaction products formed in step (γ) are withdrawn continuously from the second reactor. In this respect, at least the second reactor can be regarded as being continuously operated. A continuously operated reactor in the context of this invention refers to a reactor into which at least alkylene oxide, carbon dioxide, DMC catalyst and H-functional starter compound are metered continuously, and the product mixture is withdrawn from the reactor continuously.

In a further embodiment of the process of the invention, the sum total of the mass flow rates introduced into the second reactor, at least over a particular period of time, is equal to the sum total of the mass flow rates discharged from the second reactor. Preferably, this period of time corresponds at least to the mean residence time of the liquid phase in the reactor; more preferably, this period of time is longer than three times and more preferably ten times the mean residence time of the liquid phase in the reactor.

In a further embodiment of the process of the invention, the ratio of the mass flow rate at which the first reaction mixture is metered into the second reactor to the mass flow rate at which alkylene oxide is metered into the second reactor is $\geq 0.001$ to $\leq 10$, preferably $\geq 0.1$ to $\leq 5$ and most preferably $\geq 0.25$ to $\leq 2.5$.

In a further embodiment of the process of the invention, the first reactor and/or the second reactor is a backmixed reactor. "Backmixed" in the context of the invention is understood to mean a reactor in which the concentrations of all substances in the liquid reaction mixture are constant in terms of space and time within certain limits. Such an isotropic concentration distribution in the liquid reaction mixture can be brought about by stirring the reaction mixture or by means of a pumped circulation system.

In a further embodiment of the process of the invention, a portion of the product obtained after step (γ) is recycled into the first and/or second reactor.

In a further embodiment of the process of the invention, the alkylene oxide used is ethylene oxide and/or propylene oxide.

In a further embodiment of the process of the invention, a multitude of alkylene oxides are used in step (β) and/or in step (γ).

In a further embodiment of the process of the invention, a multitude of H-functional starter compounds are used in step (β) and/or in step (γ).

In a further embodiment of the process of the invention, the H-functional starter compound used is at least one compound selected from the group consisting of alcohols, amines, thiols, amino alcohols, thio alcohols, hydroxy esters, polyether polyols, polyester polyols, polyester ether polyols, polycarbonate polyols, polyether carbonate polyols, polyethyleneimines, poly etheramines, polytetrahydrofurans, polyether thiols, polyacrylate polyols, castor oil, the mono- or diglyceride of ricinoleic acid, monoglycerides of fatty acids, chemically modified mono-, di- and/or triglycerides of fatty acids and $C_1$-$C_{24}$-alkyl fatty acid esters containing an average of at least 2 OH groups per molecule.

In a further embodiment of the process of the invention, the double metal cyanide catalyst used comprises at least one compound selected from the group of zinc hexacyanocobaltate(III), zinc hexacyanoiridate(III), zinc hexacyanoferrate(III) and cobalt(II) hexacyanocobaltate(III).

In a further embodiment of the process of the invention, steps β) and/or γ) are conducted at a pressure of ≥10 mbar to ≤100 bar, preferably ≥100 mbar to ≤90 bar and more preferably ≥500 mbar to ≤75 bar.

A further embodiment of the invention provides a process wherein
(α) the pretreatment of the double metal cyanide catalyst (DMC catalyst) is effected at a temperature of 50 to 200° C. and/or reduced pressure (absolute) of 10 mbar to 800 mbar, wherein
(α1) the first reactor is initially charged with the DMC catalyst and H-functional starter compound,
(α2) an inert gas, an inert gas-carbon dioxide mixture or carbon dioxide is passed through the first reactor at a temperature of 50 to 200° C. and, at the same time, a reduced pressure (in absolute terms) of 10 mbar to 800 mbar is established in the first reactor by removing the inert gas or carbon dioxide.

It is possible that the activation of the DMC catalyst (step (β)) is effected in the presence or absence of carbon dioxide.

A further embodiment of the invention provides a process wherein, in step (α), the DMC catalyst and H-functional starter compound are metered continuously into the first reactor.

In a preferred variant of the two embodiments outlined above, the amount of one or more alkylene oxides used in the activation in step (β) is 0.1% to 25.0% by weight, preferably 1.0% to 20.0% by weight, more preferably 2.0% to 16.0% by weight (based on the amount of suspension medium used in step (β)). The alkylene oxide may be added in one step or in a stepwise addition in two or more portions.

The DMC catalyst is preferably used in an amount such that the amount of DMC catalyst in the resulting polyether carbonate polyol is 10 to 10 000 ppm, more preferably 20 to 5000 ppm, and most preferably 50 to 500 ppm.

Step (α):
The addition of the individual components in step (α1) can be effected simultaneously or successively in any sequence; preferably, in step (α1), DMC catalyst is first initially charged and H-functional starter compound is added simultaneously or subsequently.

A further preferred embodiment provides a process wherein, in step (α),
(α1) the first reactor is initially charged with the DMC catalyst and the H-functional starter compound or a mixture of at least two H-functional starter compounds, optionally under inert gas atmosphere (for example nitrogen or argon), under an atmosphere of inert gas-carbon dioxide mixture or under a pure carbon dioxide atmosphere, more preferably under inert gas atmosphere (for example nitrogen or argon) and
(α2) an inert gas (for example nitrogen or a noble gas such as argon), an inert gas-carbon dioxide mixture or carbon dioxide, more preferably an inert gas (for example nitrogen or argon), is introduced into the resulting mixture of DMC catalyst and one or more H-functional starter compounds in the first reactor at a temperature of 50 to 200° C., preferably of 80 to 160° C., more preferably of 125 to 135° C., and at the same time, by removing the inert gas or carbon dioxide (with a pump, for example), a reduced pressure (absolute) of 10 mbar to 800 mbar, preferably of 40 mbar to 200 mbar, is set in the reactor, with addition of the double metal cyanide catalyst to the H-functional starter compound or to the mixture of at least two H-functional starter compounds in step (α1) or immediately thereafter in step (α2).

In step (α1), the DMC catalyst and the H-functional starter compound can be metered continuously into the first reactor.

Step (β):
The establishment of an atmosphere of inert gas-carbon dioxide mixture (for example nitrogen-carbon dioxide mixture or argon-carbon dioxide mixture) or of a pure carbon dioxide atmosphere and the metered addition of one or more alkylene oxides can in principle be effected in different ways. The supply pressure is preferably established by introduction of carbon dioxide, where the pressure (in absolute terms) is 10 mbar to 100 bar, preferably 100 mbar to 90 bar and more preferably 500 mbar to 75 bar. The commencement of the metered addition of the alkylene oxide can be effected from vacuum or at a previously chosen supply pressure. The total pressure (in absolute terms) of the atmosphere of inert gas-carbon dioxide mixture (for example nitrogen-carbon dioxide mixture or argon-carbon dioxide mixture) or of a pure carbon dioxide atmosphere and any alkylene oxide set in step (β) is preferably a range from 10 mbar to 100 bar, preferably 100 mbar to 75 bar and more preferably 500 mbar to 75 bar. Optionally, during or after the metered addition of the alkylene oxide, the pressure is readjusted by introducing further carbon dioxide, where the pressure (in absolute terms) is 10 mbar to 100 bar, preferably 100 mbar to 75 bar and more preferably 500 mbar to 75 bar.

The DMC catalyst can be added in solid form or as a suspension in an H-functional starter compound. If the DMC catalyst is added as a suspension, this is preferably added in step (α1) to the H-functional starter compound.

In a preferred embodiment of the invention, in step (β), the suspension medium used is at least one H-functional starter compound selected from the group consisting of polyether polyols, polycarbonate polyols, polyester carbonate polyols, polyether ester carbonate polyols and polyether carbonate polyols, wherein these H-functional starter compounds each have a hydroxyl number in the range from 3.0 mg KOH/g to 1000 mg KOH/g, preferably from 3.0 mg KOH/g to 300 mg KOH/g.

Step (γ): (Co)polymerization
The continuous addition of the first reaction mixture (resulting from step (β)), alkylene oxide and carbon dioxide and any H-functional starter compound to a second reactor can be effected simultaneously or alternately. It is possible during the addition to raise or to lower the $CO_2$ pressure, gradually or in steps, or to leave it the same. Preferably, the total pressure is kept constant during the reaction. The metered addition of the first reaction mixture, alkylene oxide and optionally H-functional starter compound is effected simultaneously or alternately with respect to the metered addition of carbon dioxide. It is possible to meter in the first reaction mixture, alkylene oxide and optionally H-functional starter compound each at a constant metering rate, or to increase or lower the metering rate of each gradually or stepwise, or to add these individual components in portions. Preferably, the first reaction mixture, alkylene oxide and optionally H-functional starter compound are added to the reaction mixture at a constant metering rate. If a plurality of alkylene oxides are used for synthesis of the polyether carbonate polyols, the alkylene oxides can be metered in individually or as a mixture. The metered addition of the alkylene oxides can be effected simultaneously or alternately, each via separate metering points (addition points), or via one or more metering points and the alkylene oxides may be metered in individually or as a mixture.

The term "continuously" used here can be defined as the mode of addition of a component such that an essentially continuously effective concentration of the DMC catalyst or the reactant is maintained. A component can be added in a truly continuous manner or in relatively tightly spaced increments. There would be no departure from the present process in adding a component (comprising DMC catalyst or reactants) incrementally such that the concentration of the components added drops essentially to zero for a period prior to the next incremental addition. However, it is preferable that the DMC catalyst concentration is kept essentially at the same concentration during the main portion of the procedure of the continuous reaction, and that H-functional starter substance is present during the main portion of the (co)polymerization process. Incremental addition of a component that does not significantly affect the characteristics of the product is nevertheless "continuous" in that sense in which the term is used here. It is possible, for example, to provide a recycling loop in which a portion of the reacting mixture is recycled to a prior point in the process, which smoothes out discontinuities caused by incremental additions.

Preference is given to using an excess of carbon dioxide based on the calculated amount of carbon dioxide incorporated in the polyether carbonate polyol, since an excess of carbon dioxide is advantageous because of the inertness of carbon dioxide. The amount of carbon dioxide can be fixed via the total pressure under the respective reaction conditions. An advantageous total pressure (in absolute terms) for the copolymerization for preparation of the polyether carbonate polyols has been found to be in the range from 0.01 to 120 bar, preferably 0.1 to 110 bar, particularly preferably from 1 to 100 bar. According to the reaction conditions selected, it is possible to introduce the $CO_2$ into the reactor in the gaseous, liquid or supercritical state.

In steps ($\beta$) and/or ($\gamma$) the carbon dioxide is preferably introduced into the mixture by (i) sparging the reaction mixture in the reactor from below (for example via an inlet tube or a sparging ring (distributor ring) with passage of the gas below the stirrer blade) and, depending on the gas loading, optionally in combination with a gas division stirrer (for example a disk stirrer, paddle stirrer, Rushton turbine (for example Lightnin R-100®, Ekato PHASE-JET®, Smith-Turbine® from Philadelphia Mixing Solutions, Chemineer BT-6® or CD-6® stirrer blade), optionally with arrangement of further stirrer systems (of any desired type, for example, depending on the slenderness ratio of the reactor, axially conveying turbines, stirrer systems which support heat transfer to internal cooling surfaces and/or promote mass transfer via the liquid surface) on the stirrer shaft; a combination of two or more stirrer systems has the technical advantage that the mass transfer of the gas to the liquid phase at the surface of the reaction mixture can be improved;

(ii) using a hollow shaft stirrer (i.e. by means of the ejector principle), for example in the form of a tube stirrer, pitched blade turbine having hollow blades, Ekato GAS-JET®, PREMEX "br" series laboratory sparging stirrer, laboratory sparging stirrer from Parr Instruments; the effect of using a hollow shaft stirrer is that the gas phase accumulating in the gas space is aspirated through a hollow shaft and reintroduced into the reaction mixture from below;

(iii) combination of the metered additions according to (i) and (ii), which is advantageous for operation at a constant fill level in the reactor; for example, the combination of the metered additions according to (i) and (ii) can be effected such that a sparging of the reaction mixture in the reactor from below as per any of the options recited under (i) is combined with a hollow shaft stirrer according to (ii) (for example a gas division stirrer having an ejector as a second dispersion stage arranged thereabove), preferably in such a way that the introduction of the gas is effected from below, beneath the hollow shaft stirrer; and/or (iv) sparging via the liquid surface by using appropriate stirrer systems typically with a multilevel design (e.g. MIG or Ekato MIG/INTERMIG®) or by means of stirrer systems which act at the liquid surface (e.g. gate stirrers).

The configuration of the stirring conditions is to be undertaken on a case-by-case basis by those skilled in the art depending on the reaction conditions (e.g. liquid phase viscosity, gas loading, surface tension) and according to the state of the art of stirring in order to reliably avoid, for example, flooding of a stirring means sparged from below or to ensure the desired power input and/or mass transfer in the sparging state. The reactor optionally comprises internals, for example baffles and/or cooling surfaces (configured as a tube, coil, plates or in a similar shape), sparging ring and/or inlet tube. Further heat exchange surfaces may be arranged in a pumped circulation circuit, in which case the reaction mixture is conveyed via suitable pumps (e.g. screw-spindle pumps, centrifugal pumps or gear pumps). The circulation stream may, for example, also be recycled into the reactor via an injector nozzle to aspirate a portion of the gas space and intensively mix it with the liquid phase to improve mass transfer.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow shaft stirrer is preferably a stirrer wherein the gas is introduced into the reaction mixture via a hollow shaft in the stirrer. The rotation of the stirrer in the reaction mixture (i.e. in the course of mixing) gives rise to a negative pressure at the end of the stirrer blade connected to the hollow shaft, such that the gas phase (containing $CO_2$ and any unconsumed alkylene oxide) is sucked out of the gas space above the reaction mixture and is passed through the hollow shaft of the stirrer into the reaction mixture.

The sparging of the reaction mixture as per (i), (ii), (iii) or (iv) can be effected with freshly metered-in carbon dioxide in each case and/or may be combined with sucking of the gas out of the gas space above the reaction mixture and subsequent recompression of the gas. For example, the gas sucked out of the gas space above the reaction mixture and compressed, optionally mixed with fresh carbon dioxide and/or alkylene oxide, is introduced into the reaction mixture as per (i), (ii), (iii) and/or (iv). Preference is given to using an excess of carbon dioxide, such that carbon dioxide freshly metered in at least compensates for the pressure drop which arises via incorporation of the carbon dioxide and the alkylene oxide into the reaction product in the copolymerization.

The introduction of the alkylene oxide can be effected separately or together with the $CO_2$, either via the liquid surface or directly into the liquid phase. Preferably, the alkylene oxide is introduced directly into the liquid phase, since this has the advantage that rapid mixing of the introduced alkylene oxide with the liquid phase is effected and local concentration peaks of alkylene oxide are thus avoided. The introduction into the liquid phase can be effected via one or more inlet tubes, one or more nozzles or one or more annular arrangements of multiple metering points, which are preferably arranged at the base of the reactor and/or at the side wall of the reactor.

For the process of the invention, it has additionally been found that the (co)polymerization (step (γ)) for preparation of the polyether carbonate polyols is conducted advantageously at 50° C. to 150° C., preferably at 60° C. to 145° C., more preferably at 70° C. to 140° C. and most preferably at 90° C. to 130° C. Below 50° C. the reaction proceeds only very slowly. At temperatures above 150° C. the amount of unwanted by-products rises significantly.

Steps (α), (β) and (γ) are performed in accordance with the invention at least in two successive reactors, namely steps (α), (β) in a first reactor and step (γ) in a second reactor. The three steps (α), (β) and (γ) can also each be performed separately in three successive reactors. Particularly preferred reactor types in each case are stirred tanks, tubular reactors, tubular reactors with recycling, and loop reactors. For each step, it is possible to use a different reactor type.

A preferred embodiment for the (co)polymerization in a continuously operated stirred tank, in a tubular reactor with recycling or in a loop reactor is characterized in that the first reaction mixture, alkylene oxide, carbon dioxide and H-functional starter compound are added continuously to the second reactor. If, in step (β), the suspension medium used is at least one H-functional starter compound, the amount of the H-functional starter compound added in step (γ) is at least 20 mol % equivalents, more preferably 70 to 95 mol % equivalents (based in each case on the total amount of H-functional starter compounds). Preferably, a portion of the product mixture is withdrawn continuously from the stirred tank, tubular reactor with recycling or loop reactor; this has the advantage that the amount of product mixture present in the second reactor remains constant within certain limits.

The stirred tank or tubular reactor with recycling, according to the design and mode of operation, is cooled via the reactor shell, internal cooling surfaces and/or cooling surfaces within the pumped circulation system. Particular attention should be paid to the rate of metered addition of the alkylene oxide. It should be adjusted such that the alkylene oxides react sufficiently rapidly despite the inhibiting effect of the carbon dioxide. The concentration of free alkylene oxides in the reaction mixture during the activation step (step (β)) is preferably >0% to 100% by weight, more preferably >0% to 50% by weight, most preferably >0% to 20% by weight (based in each case on the weight of the reaction mixture). The concentration of free alkylene oxides in the reaction mixture during the (co)polymerization (step (γ)) is preferably >0% to 40% by weight, more preferably >0% to 25% by weight, most preferably >0% to 15% by weight (based in each case on the weight of the reaction mixture).

When the reaction is conducted in a tubular reactor, the catalyst-starter mixture dried in step (α) or the catalyst/suspension medium mixture activated in steps (α) and (β) and any further H-functional starter compound and alkylene oxides and carbon dioxide are pumped continuously through a tube. When using a catalyst/suspension medium mixture dried in step (α), the activation in step (β) is effected in the first portion of the tubular reactor, and the (co)polymerization in step (γ) in the second portion of the tubular reactor. A portion of the reaction mixture obtained, for the activation in step (β), can be recycled into the first portion of the tubular reactor, or the (co)polymerization in step (γ) into the second portion of the tubular reactor. The molar ratios of the co-reactants vary according to the desired polymer. In a preferred embodiment carbon dioxide is metered in its liquid or supercritical form to achieve optimal miscibility of the components. The carbon dioxide can be introduced into the reactor at the entrance to the reactor and/or via metering points arranged along the reactor. A portion of the epoxide can be introduced at the entrance to the reactor. The remaining amount of the epoxide is preferably introduced into the reactor via a plurality of metering points arranged along the reactor. It is advantageous to install mixing elements for better mixing of the co-reactants as are marketed for example by Ehrfeld Mikrotechnik BTS GmbH or mixer-heat exchanger elements which simultaneously improve mixing and heat removal. The mixing elements preferably mix metered-in $CO_2$ and/or alkylene oxide with the reaction mixture. In an alternative embodiment, different volume elements of the reaction mixture are mixed with one another.

Loop reactors can likewise be used for preparation of polyether carbonate polyols. These generally include reactors having internal and/or external material recycling (optionally with heat exchanger surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In a preferred embodiment, prior to commencement of the polymerization reaction, the second reactor in which the polymerization step is conducted is charged with a polyether carbonate polyol obtained as product. For this purpose, in the second reactor in which the polymerization step is conducted, a product can first be prepared in semi-batchwise operation and then, on attainment of the maximum fill level, operation can be switched to continuous operation. Alternatively, the second reactor in which the polymerization step is conducted can be charged with the product mixture from a previously conducted polymerization.

Step (δ)

In an optional step (δ) the reaction mixture continuously removed in step (γ) which generally has an alkylene oxide content of from 0.05% by weight to 10% by weight may be transferred into a postreactor in which, by way of a post-reaction, the content of free alkylene oxide is reduced to less than 0.05% by weight in the reaction mixture. The postreactor may be a tubular reactor, a loop reactor or a stirred tank for example.

The pressure in this postreactor is preferably at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 50° C. to 150° C. and more preferably 80° C. to 140° C.

The present invention likewise relates to a polyether carbonate polyol obtained by a process of the invention. The polyether carbonate polyols obtained in accordance with the invention preferably have an OH functionality (i.e. average number of OH groups per molecule) of at least 0.8, preferably of 1 to 8, more preferably of 1 to 6 and most preferably of 2 to 4. The molecular weight of the polyether carbonate polyols obtained (GPC) is generally at least 400 to 1 000 000 g/mol, preferably 400 to 100 000 g/mol and more preferably 500 to 6000 g/mol.

The polyether carbonate polyols obtained by the process of the invention can be processed without difficulty, especially by reaction with di- and/or polyisocyanates to afford polyurethanes, in particular flexible polyurethane foams. For polyurethane applications, it is preferable to use polyether carbonate polyols based on an H-functional starter compound having a functionality of at least 2. In addition, the polyether carbonate polyols obtainable by the process of the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain physical properties, for example molecular weight, viscosity, functionality and/or hydroxyl number.

EXAMPLES

The invention is more particularly elucidated with reference to the examples which follow but without any intention to limit the invention thereto. The examples show:
H-functional starter compounds (starters) used:
PET-1: trifunctional poly(oxypropylene) polyol having an OH number of 240 mg KOH/g
PET-2: difunctional poly(oxypropylene) polyol having an OH number of 112.2 mg KOH/g
Propylene glycol: diol having an OH number of 1475 mg KOH/g
The DMC catalyst was prepared according to example 6 of WO-A 01/80994.
The values for pressure refer to the absolute pressure.
The 1000 mL pressure reactor used in the examples for the preparation of a mixture of activated DMC catalyst and starter compound had an (internal) height of 13.72 cm and an internal diameter of 9.53 cm. The reactor was equipped with an electrical heating jacket (maximum heating power 1000 watts). The counter-cooling consisted of an immersed tube of external diameter 6 mm which had been bent into a U shape and which projected into the reactor up to 5 mm above the base, and through which cooling water flowed at about 20° C. The water flow was switched on and off by means of a magnetic valve. In addition, the reactor was equipped with an inlet tube and a thermal sensor of diameter 1.6 mm, which projected into the reactor up to 3 mm above the base.

The heating power of the electrical heating jacket during activation [step (β)] was on average about 20% of the maximum heating power. As a result of the adjustment, the heating power varied by ±5% of the maximum heating power. The occurrence of increased evolution of heat in the reactor, brought about by the rapid reaction of propylene oxide during the activation of the catalyst [step (β)], was observed via reduced heating power of the heating jacket, engagement of the counter-cooling, and, as the case may be, a temperature increase in the reactor. The occurrence of evolution of heat in the reactor, brought about by the continuous reaction of propylene oxide during the reaction [step (γ)], led to a fall in the power of the heating jacket to about 8% of the maximum heating power. As a result of the adjustment, the heating power varied by ±5% of the maximum heating power.

The hollow shaft stirrer used in the examples was a hollow shaft stirrer in which the gas was introduced into the reaction mixture via a hollow shaft in the stirrer. The stirrer body mounted on the hollow shaft had four arms with a diameter of 50 mm and a height of 20 mm. At each end of the arm were mounted three gas outlets which had a diameter of 3 mm. The rotation of the stirrer gave rise to a reduced pressure such that the gas present above the reaction mixture ($CO_2$ and possibly alkylene oxide) was drawn off and introduced through the hollow shaft of the stirrer into the reaction mixture.

The polymerization reactions were conducted in a Parr system. The system consisted of three pressure vessels connected in series (reactor R1, reactor R2 and reactor R3).

Reactor R1 (volume 300 mL) had an (internal) height of 10.16 cm and an internal diameter of 6.35 cm. The reactor was equipped with an electrical heating jacket (maximum heating power 510 watts). The counter-cooling consisted of an immersed tube of external diameter 3.17 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube for inert gas (argon) an inlet tube for propylene oxide, and a thermal sensor of diameter 3.17 mm, which projected into the reactor up to 3 mm above the base. In addition, the reactor was equipped with an inlet tube for inert gas or carbon dioxide and a connection for vacuum, which led into the gas phase of the reactor. The reactor was stirred by means of an impeller stirrer, which was a pitched blade turbine in which a total of two stirrer levels each having four stirrer paddles (45°) which had a diameter of 35 mm and a height of 10 mm were mounted at a distance of 7 mm on the stirrer shaft. The liquid phase was metered into the reactor R2 via a mass flow regulator.

Reactor R2 (volume 300 mL) had an (internal) height of 10.16 cm and an internal diameter of 6.35 cm. The reactor was equipped with an electrical heating jacket (maximum heating power 510 watts). The counter-cooling consisted of a tube having an external diameter of 3.17 mm which had been bent into a spiral shape, and through which cooling water flowed at about 10° C. The water flow was switched on and off by means of a magnetic valve. In addition, the reactor was equipped with an inlet tube for inert gas (argon) an inlet tube for propylene oxide, and a thermal sensor of diameter 3.17 mm, which projected into the reactor. In addition, the reactor was equipped with an inlet tube for inert gas or carbon dioxide and a connection for vacuum, which led into the gas phase of the reactor. The reactor was stirred by means of an impeller stirrer which was in the middle of a baffle plate. The impeller stirrer was a pitched blade turbine in which there was a stirrer level having four stirrer blades (45°) which had a diameter of 35 mm and a height of 10 mm on the stirrer shaft. The overflow was conducted into the reactor R3 via a heated tube.

Reactor R3 (volume 1700 mL) had an (internal) height of 28.5 cm and an internal diameter of 9.82 cm. The reactor was equipped with an electrical heating jacket (maximum heating power 510 watts). The counter-cooling consisted of an immersed tube of external diameter 6.35 mm which had been bent into a spiral shape and which projected into the reactor up to 5 mm above the base, and through which cooling water flowed at about 10° C. The water flow was switched on and off by means of a magnetic valve. In addition, the reactor was equipped with a thermal sensor of diameter 3.17 mm, which projected into the reactor up to 3 mm above the base. The reactor was stirred by means of a spiral stirrer in which a rectangular metal bar in spiral form with a cross section of 12.4×45 mm was mounted on the stirrer shaft, and the spirals had an external diameter of 6 cm, an internal diameter of 4.6 cm and a height of 14 cm. The gas phase was released into the waste air outlet via a supply pressure regulator.

For the recording of the propylene oxide concentration during the catalyst activation in reactor R1 and the conversion of propylene oxide in the (co)polymerization reactor R2, a Bruker MATRIX-MF spectrometer equipped with 3.17 mm ATR-IR fiber optic probes was used. The ATR-IR fiber optic probes (90° diamond prism with base area 1×2 mm and height 1 mm as ATR element, 2×45° reflection of the IR beam, IR beam coupled in via fiber optics) were installed into the reactors in such a way that the diamond at the end of the 3.17 mm ATR fiber optic probe was completely immersed into the reaction mixture. IR spectra (average of 100 scans) were recorded every 60 seconds in the 4000-650 cm$^{-1}$ range with a resolution of 4 cm$^{-1}$. The propylene oxide concentration was monitored by recording the characteristic band for propylene oxide at 830 cm$^{-1}$. A decrease in the intensity of the band at 830 cm$^{-1}$ to 5% of the maximum value was regarded as complete conversion of propylene oxide for the catalyst activation. In the calculation of the conversion of propylene oxide in the copolymerization reactor R2, the expansion in volume which is caused by dissolved $CO_2$ was taken into account (13.4% at 50 bar). In addition, after attainment of a steady state, a sample was taken from reactor R2 via a valve. The reaction mixture was characterized by $^1$H NMR spectroscopy and gel permeation chromatography.

The specific product output of the reactor P was determined by the following formula as the quotient of the mass flow rate of propylene oxide used $\dot{m}_{po}$ and starter compound $\dot{m}_s$ multiplied by the conversion of propylene oxide obtained $X_{PO}$ and the volume of the liquid phase in reactor R2 ($V_{fl}$=0.175 l). The specific product output is reported in kg/(m$^3$·h).

$$P = \frac{(\dot{m}_{PO} + \dot{m}_S) \times X_{PO}}{V_{fl}}$$

The copolymerization resulted not only in the cyclic propylene carbonate but also in the polyether carbonate polyol containing the following polycarbonate and polyether units:

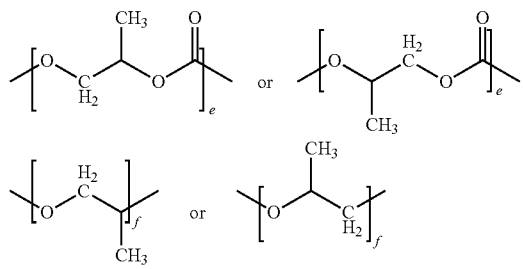

The ratio of the amount of cyclic propylene carbonate to polyether carbonate polyol (selectivity) and the molar ratio of carbonate groups to ether groups in the polyether carbonate polyol (e/f ratio) and the proportion of propylene oxide converted (C in mol %) were determined by means of $^1$H NMR spectroscopy. Each sample was dissolved in deuterated chloroform and analyzed on a Bruker spectrometer (AV400, 400 MHz). The relevant resonances in the $^1$H NMR spectrum (based on TMS=0 ppm) which were used for integration are as follows:
I1: 1.11-1.17: methyl group of the polyether units, resonance area corresponds to three hydrogen atoms
I2: 1.25-1.32: methyl group of the polycarbonate units, resonance area corresponds to three hydrogen atoms
I3: 1.45-1.49: methyl group of the cyclic carbonate, resonance area corresponds to three hydrogen atoms
I4: 2.95-2.99: CH group for free, unreacted propylene oxide, resonance area corresponds to one hydrogen atom The figures reported are the molar ratio of the amount of cyclic propylene carbonate to carbonate units in the polyether carbonate polyol (selectivity, g/e) and the molar ratio of carbonate groups to ether groups in the polyether carbonate polyol (e/f), and also the proportion of propylene oxide converted (C in mol %).

Taking account of the relative intensities, the values were calculated as follows:

Molar ratio of the amount of cyclic propylene carbonate to carbonate units in the polyether carbonate polyol (selectivity, g/e):

$$g/e = I3/I2$$

Molar ratio of carbonate groups to ether groups in the polymer (e/f):

$$e/f = I2/I1$$

The molar proportion of the propylene oxide converted (C in mol %) based on the sum total of the amount of propylene oxide used in the activation and the copolymerization is calculated by the formula:

$$C = [(I1/3) + (I2/3) + (I3/3))/((I1/3) + (I2/3) + (I3/3) + I4)] * 100\%$$

The number-average molecular weight $M_n$ and the weight-average molecular weight $M_w$ of the resulting polymers were determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 mL/min; columns: 2×PSS SDV linear M, 8×300 mm, 5 µm; RID detector). Polystyrene samples of known molar mass were used for calibration. In order to more specifically define the proportion of higher molecular weight chains, the molecular weight $M_{90}$ below which 90% of all chain lengths are to be found was calculated. The figure reported is the ratio of $M_{90}$ to $M_n$. The greater the ratio, the more long chains are present in the sample.

Subsequently, the sample of the reaction mixture taken was taken up with dichloromethane (20 mL) and the mixture was passed through a falling-film evaporator. The mixture (0.1 kg in 1 h) ran downward along the inner wall of a tube of diameter 70 mm and length 200 mm which had been heated externally to 120° C., in the course of which the mixture was distributed homogeneously as a thin film on the inner wall of the falling-film evaporator by each of three rollers of diameter 10 mm rotating at a speed of 250 rpm. Within the tube, a pump was used to set a pressure of <1 mbar. The reaction mixture which had been purified to free it of volatile constituents (unconverted epoxides, cyclic carbonate, dichloromethane) was collected in a receiver at the lower end of the heated tube.

The polyether carbonate polyol was characterized by $^1$H NMR spectroscopy and determination of the OH number and viscosity:

The OH number (hydroxyl number) was determined based on DIN 53240-2 but using N-methylpyrrolidone rather than THF/dichloromethane as solvent. A 0.5 molar ethanolic KOH solution was used for titration (endpoint recognition by potentiometry). The test substance used was castor oil with certified OH number. The reporting of the unit in "mg KOH/g" refers to mg[KOH]/g[polyether carbonate polyol].

Viscosity was determined on an Anton Paar Physica MCR 501 rheometer. A cone-plate configuration having a separation of 1 mm was selected (DCP25 measurement system). The polyether carbonate polyol (0.1 g) was applied to the rheometer plate and subjected to a shear of 0.01 to 1000 l/s at 25° C. and the viscosity was measured every 10 s for 10 min. The figure reported is the viscosity averaged over all measurement points.

The $CO_2$ content, the hydroxyl number and the employed starter were used in each case to calculate the e/f ratio (see formula (Ia)) for the respective polyether carbonate polyol.

Example 1: Continuous Process for Copolymerization of Propylene Oxide and $CO_2$ Using a DMC Catalyst Activated Under $CO_2$ Process Steps:

Step ($\alpha$) Preparation of a Mixture of DMC Catalyst and Starter Compound:

A 300 mL pressure reactor (reactor R1) equipped with an impeller stirrer was initially charged with a mixture of DMC catalyst (0.1575 g) and PET-1 (200.81 g). The reactor was closed, the pressure in reactor R1 was reduced to 50 mbar and the reactor was heated up to 130° C. Subsequently, a gentle Ar stream was introduced into the reaction mixture at the base of the reactor. By regulating the Ar stream and simultaneously removing the gas from the reactor R1 with a pump, the pressure in the reactor was adjusted to 50 mbar and the mixture was stirred (500 rpm) at 130° C. under reduced pressure (50 mbar) and a gentle Ar stream for 30 min.

Step ($\beta$) (Activation):

Reactor R1 was charged with $CO_2$ to 50 bar, which resulted in a slight drop in the temperature in reactor R1. The temperature was kept at 130° C. by closed-loop control and, during the subsequent steps, the pressure in the reactor was kept at 50 bar by metering in further $CO_2$. 19.4 g of propylene oxide were metered into the mixture from step ($\alpha$) in reactor R1 with the aid of an HPLC pump (10 mL/min). The decrease in the propylene oxide concentration was monitored via IR spectroscopy. The reaction mixture was stirred (500 rpm) until the conversion of the propylene oxide was complete (about 15 min). Subsequently, two further portions each of 19.4 g of propylene oxide were metered in with the aid of the HPLC pump (10 mL/min) and the reaction mixture was stirred (500 rpm) in each case until the conversion of the propylene oxide was complete (about 15 min). The occurrence of a brief increase in evolution of heat in the reactor after addition of the propylene oxide confirmed the activation of the catalyst. Subsequently, the mixture of DMC catalyst and starter compound in reactor R1 was cooled to room temperature (25° C.) and the mixture was stirred at 100 rpm. The pressure in reactor R1 was adjusted to 100 bar with argon, which is introduced into the gas phase, and kept at 100 bar by further metered addition during the subsequent steps.

Step ($\gamma$) ((Co)polymerization):

A 300 mL pressure reactor (reactor R2) equipped with an impeller stirrer and a baffle plate was initially charged with a mixture of DMC catalyst (0.0549 g) and PET-1 (70 g). Reactor R2 was closed, the pressure in reactor R2 was reduced to 50 mbar and reactor R2 was heated up to 130° C. Subsequently, a gentle Ar stream into the reaction mixture at the base of reactor R2 was established. By regulating the gentle Ar stream and simultaneously removing the gas with a pump, the pressure in reactor R2 was adjusted to 50 mbar and the mixture was stirred (500 rpm) at 130° C. under reduced pressure (50 mbar) and a gentle Ar stream for 30 min. $CO_2$ was gradually injected to 50 bar (over ≥15 min). During the subsequent steps, the pressure in reactor R2 was kept at 50 bar by metering in further $CO_2$. 7 g of propylene oxide were metered in with the aid of a mass flow regulator (200 g/h). The decrease in the propylene oxide concentration was monitored via IR spectroscopy. The reaction mixture was stirred (500 rpm) until the conversion of the propylene oxide was complete (about 15 min). Subsequently, two further portions each of 7 g of propylene oxide were metered in with the aid of a mass flow regulator (200 g/h) and the reaction mixture was stirred (500 rpm) in each case until the conversion of the propylene oxide was complete (about 15 min). The occurrence of a brief increase in evolution of heat in the reactor after addition of the propylene oxide confirmed the activation of the catalyst. Subsequently, the temperature of the mixture in reactor R2 was lowered to 100° C.

Subsequently, the valve at the outlet of reactor R2 was opened. $CO_2$ was introduced continuously into the gas phase of reactor R2 at a flow rate of 20 g/h. The outlet stream was led off via a further pressure vessel (reactor R3) and a supply pressure regulator. The pressure in reactors 2 and 3 was set to 50 bar by means of the supply pressure regulator. 30 g/h of propylene oxide were metered continuously into reactor R2 via a mass flow regulator. As soon as the overflow from reactor R2 (at liquid volume 175 mL) had been attained, the continuous propylene oxide stream was turned down to 20.6 g/h. At the same time, the mixture of starter compound and activated DMC catalyst from reactor R1 was introduced continuously into reactor R2 at a rate of 10.0 g/h. The overflow from reactor R2 was introduced into reactor R3. The product mixture was collected in reactor R3 at 100° C. under pressure and stirred at 200 rpm.

After an operating time of 24 hours, a sample of the liquid phase was taken from reactor R2 (reaction mixture) via a valve and analyzed.

Characterization of the Reaction Mixture in Reactor R2:

The IR spectroscopy analysis of the reaction mixture in reactor R2 directly before taking of the sample showed a conversion of propylene oxide of 97.3%.

The specific product output of reactor R2 was 170.2 [kg/($m^3 \cdot h$)].

Characterization of the Reaction Mixture Withdrawn from Reactor R2 in the Steady State:

The NMR spectroscopy analysis gave a selectivity g/e of 0.11.

The molar ratio of carbonate groups to ether groups in the polyether carbonate polyol e/f was 23.72/76.28.

The polyether carbonate polyol obtained had a molecular weight $M_n$=3755 g/mol, $M_w$=4512 g/mol and a polydispersity of 1.20. The molecular weight $M_{90}$ was 6880 g/mol.

Characterization of the Product Mixture from Reactor R3 after Removal of the Volatile Constituents in a Falling-Film Evaporator:

OH number: 53.7 mg KOH/g.
Viscosity: 5.0 Pa s.

Example 2 (Comparative): Continuous Process for Copolymerization of Propylene Oxide and $CO_2$ Using an Unactivated DMC Catalyst Process Steps:

Preparation of a Mixture of DMC Catalyst and Starter Compound:

A 300 mL pressure reactor (reactor R1) equipped with an impeller stirrer was initially charged with a mixture of DMC catalyst (0.1971 g) and PET-1 (249.97 g). The reactor was closed and the mixture of DMC catalyst and starter compound in reactor R1 was stirred at 100 rpm at room temperature (25° C.) overnight. The pressure in reactor R1 was adjusted to 100 bar with argon, which is introduced into the gas phase, and kept at 100 bar by further metered addition during the subsequent steps.

Step (γ) ((Co)polymerization):

A 300 mL pressure reactor (reactor R2) equipped with an impeller stirrer and a baffle plate was initially charged with a mixture of DMC catalyst (0.0631 g) and PET-1 (80 g). Reactor R2 was closed, the pressure in reactor R2 was reduced to 50 mbar and reactor R2 was heated up to 130° C. Subsequently, a gentle Ar stream into the reaction mixture at the base of reactor R2 was established. By regulating the gentle Ar stream and simultaneously removing the gas with a pump, the pressure in reactor R2 was adjusted to 50 mbar and the mixture was stirred (500 rpm) at 130° C. under reduced pressure (50 mbar) and a gentle Ar stream for 30 min. $CO_2$ was gradually injected to 50 bar (over ≥15 min). During the subsequent steps, the pressure in reactor R2 was kept at 50 bar by metering in further $CO_2$. 8 g of propylene oxide were metered in with the aid of a mass flow regulator (200 g/h). The decrease in the propylene oxide concentration was monitored via IR spectroscopy. The reaction mixture was stirred (500 rpm) until the conversion of the propylene oxide was complete (about 15 min). Subsequently, two further portions each of 8 g of propylene oxide were metered in with the aid of a mass flow regulator (200 g/h) and the reaction mixture was stirred (500 rpm) in each case until the conversion of the propylene oxide was complete (about 15 min). The occurrence of a brief increase in evolution of heat in reactor R2 after addition of the propylene oxide confirmed the activation of the catalyst. Subsequently, the temperature of the mixture in reactor R2 was lowered to 100° C.

Subsequently, the valve at the outlet of reactor R2 was opened. $CO_2$ was introduced continuously into the gas phase of reactor R2 at a flow rate of 20 g/h. The outlet stream was led off via a further pressure vessel (reactor R3) and a supply pressure regulator. The pressure in reactors 2 and 3 was set to 50 bar by means of the supply pressure regulator. 30 g/h of propylene oxide were metered continuously into reactor R2 via a mass flow regulator. As soon as the overflow from reactor R2 (at liquid volume 175 mL) had been attained, the continuous propylene oxide stream was turned down to 22.9 g/h. At the same time, the mixture of starter compound and unactivated DMC catalyst from reactor R1 was introduced continuously into reactor R2 at a rate of 7.8 g/h. The overflow from reactor R2 was introduced into reactor R3. The product mixture was collected in reactor R3 at 100° C. under pressure and stirred at 200 rpm.

After an operating time of 24 hours, a sample of the liquid phase was taken from reactor R2 via a valve and analyzed.

Characterization of the Reaction Mixture in Reactor R2:

The IR spectroscopy analysis of the reaction mixture gave a conversion of propylene oxide of 92.5%.

The specific product output of reactor R2 was 161.8 [kg/(m³ h)].

Characterization of the Reaction Mixture Withdrawn from Reactor R2 in the Steady State:

The NMR spectroscopy analysis gave a selectivity g/e of 0.06.

The molar ratio of carbonate groups to ether groups in the polyether carbonate polyol e/f was 25.93/74.07.

The polyether carbonate polyol obtained had a molecular weight $M_n$=3030 g/mol, $M_w$=3983 g/mol and a polydispersity of 1.31. The molecular weight $M_{90}$ was 6214 g/mol.

Characterization of the Product Mixture from Reactor R3 after Removal of the Cyclic Carbonate in a Falling-Film Evaporator:

OH number: 54.3 mg KOH/g.

Viscosity: 5.7 Pa s.

Example 3: Continuous Process for Copolymerization of Propylene Oxide and $CO_2$ Using a DMC Catalyst Activated Under $CO_2$ Process Steps:

Step (α): Preparation of a Mixture of DMC Catalyst and Starter Compound:

A 1000 mL pressure reactor (reactor R1) equipped with a sparging stirrer was initially charged with a mixture of DMC catalyst (0.2237 g) and PET-2 (600.13 g). The reactor R1 was closed, the pressure in reactor R1 was reduced to 50 mbar and the reactor was heated up to 130° C. Subsequently, a gentle Ar stream was introduced into the reaction mixture at the base of reactor R1. By regulating the Ar stream and simultaneously removing the gas from the reactor with a pump, the pressure in reactor R1 was adjusted to 50 mbar and the mixture was stirred (500 rpm) at 130° C. under reduced pressure (50 mbar) and a gentle Ar stream for 30 min.

Step (β) (Activation):

Reactor R1 was charged with $CO_2$ to 50 bar, which resulted in a slight drop in the temperature in reactor R1. The temperature was kept at 130° C. by closed-loop control and, during the subsequent steps, the pressure in reactor R1 was kept at 50 bar by metering in further $CO_2$. 60.6 g of propylene oxide were metered into the mixture from step (α) in reactor R1 with the aid of an HPLC pump (30 mL/min). The decrease in the propylene oxide concentration was monitored via IR spectroscopy. The reaction mixture was stirred (500 rpm) until the conversion of the propylene oxide was complete (about 15 min). Subsequently, two further portions each of 60.6 g of propylene oxide were metered into reactor R1 with the aid of the HPLC pump (30 mL/min) and the reaction mixture was stirred (500 rpm) in each case until the conversion of the propylene oxide was complete (about 15 min). The occurrence of a brief increase in evolution of heat in reactor R1 after addition of the propylene oxide indicated the activation of the catalyst. Subsequently, the mixture of DMC catalyst and starter compound was cooled to room temperature (25° C.) and transferred into the 300 ml pressure reactor (reactor R1), and the mixture was stirred at 100 rpm. The pressure in reactor R1 was adjusted to 100 bar with argon, which is introduced into the gas phase, and kept at 100 bar by further metered addition during the subsequent steps. After 12 hours, the mixture was transferred into the 300 mL pressure reactor (reactor R1).

Step (γ) ((Co)polymerization):

A 300 mL pressure reactor (reactor R2) equipped with an impeller stirrer and a baffle plate was initially charged with a mixture of DMC catalyst (0.0231 g) and PET-2 (80 g). Reactor R2 was closed, the pressure in reactor R2 was reduced to 50 mbar and the reactor was heated up to 130° C. Subsequently, a gentle Ar stream into the reaction mixture at the base of reactor R2 was established. By regulating the gentle Ar stream and simultaneously removing the gas with a pump, the pressure in reactor R2 was adjusted to 50 mbar and the mixture was stirred (500 rpm) at 130° C. under reduced pressure (50 mbar) and a gentle Ar stream for 30 min. $CO_2$ was gradually injected to 50 bar (over ≥15 min). During the subsequent steps, the pressure in reactor R2 was kept at 50 bar by metering in further $CO_2$. 8 g of propylene oxide were metered in with the aid of a mass flow regulator (200 g/h). The decrease in the propylene oxide concentration was monitored via IR spectroscopy. The reaction mixture was stirred (500 rpm) until the conversion of the propylene oxide was complete (about 15 min). Subsequently, two further portions each of 8 g of propylene oxide were metered in with the aid of a mass flow regulator (200 g/h) and the reaction mixture was stirred (500 rpm) in each case until the conversion of the propylene oxide was complete (about 15 min). The occurrence of a brief increase in evolution of heat in the reactor after addition of the propylene oxide indicated the activation of the catalyst. Subsequently, the temperature of the mixture in reactor R2 was lowered to 100° C.

Subsequently, the valve at the outlet of reactor R2 was opened. $CO_2$ was introduced continuously into the gas phase of reactor R2 at a flow rate of 20 g/h. The outlet stream was led off via a further pressure vessel (reactor R3) and a supply pressure regulator. The pressure in reactors 2 and 3 was set to 50 bar by means of the supply pressure regulator. 30 g/h of propylene oxide were metered continuously into reactor R2 via a mass flow regulator. As soon as the overflow from reactor R2 (at liquid volume 175 mL) had been attained, the continuous propylene oxide stream was turned down to 8.61 g/h. At the same time, the mixture of starter compound and activated DMC catalyst from reactor R1 was introduced continuously into reactor R2 at a rate of 20.0 g/h and the $CO_2$ stream was regulated to a flow rate of 15 g/h. The overflow from reactor R2 was introduced into reactor R3. The product mixture was collected in reactor R3 at 100° C. under pressure and stirred at 200 rpm.

After an operating time of 24 hours, a sample of the liquid phase was taken from reactor R2 (reaction mixture) via a valve and analyzed.

Characterization of the Reaction Mixture in Reactor R2:

The IR spectroscopy analysis of the reaction mixture in reactor R2 directly before taking of the sample showed a conversion of propylene oxide of 99.3%.

The specific product output of reactor R2 was 162.4 [kg/(m$^3$·h)].

Characterization of the Reaction Mixture Withdrawn from Reactor R2 in the Steady State:

The NMR spectroscopy analysis gave a selectivity g/e of 0.17.

The molar ratio of carbonate groups to ether groups in the polyether carbonate polyol e/f was 15.08/84.92.

The polyether carbonate polyol obtained had a molecular weight $M_n$=2734 g/mol, $M_w$=2992 g/mol and a polydispersity of 1.09. The molecular weight $M_{90}$ was 4212 g/mol.

Characterization of the Product Mixture from Reactor R3 after Removal of the Volatile Constituents in a Falling-Film Evaporator:

OH number: 55.5 mg KOH/g.

Viscosity: 0.9 Pa s.

Example 4 (Comparative): Continuous Process for Copolymerization of Propylene Oxide and $CO_2$ Using an Unactivated DMC Catalyst Process Steps:

Preparation of a Mixture of DMC Catalyst and Starter Compound:

A 300 mL pressure reactor (reactor R1) equipped with an impeller stirrer was initially charged with a mixture of DMC catalyst (0.0903 g) and PET-2 (250.0 g). The reactor was closed and the mixture of DMC catalyst and starter compound in reactor R1 was stirred at 100 rpm at room temperature (25° C.). The pressure in reactor R1 was adjusted to 100 bar with argon, which is introduced into the gas phase, and kept at 100 bar by further metered addition during the subsequent steps. After 12 hours, the mixture of DMC catalyst (0.0911 g) and PET-2 (250.0 g) was transferred into the 300 mL pressure reactor (reactor R1).

Step (γ) (Copolymerization):

A 300 mL pressure reactor (reactor R2) equipped with an impeller stirrer and a baffle plate was initially charged with a mixture of DMC catalyst (0.0289 g) and PET-2 (80 g). Reactor R2 was closed, the pressure in the reactor was reduced to 50 mbar and reactor R2 was heated up to 130° C. Subsequently, a gentle Ar stream into the reaction mixture at the base of reactor R2 was established. By regulating the gentle Ar stream and simultaneously removing the gas with a pump, the pressure in reactor R2 was adjusted to 50 mbar and the mixture was stirred (500 rpm) at 130° C. under reduced pressure (50 mbar) and a gentle Ar stream for 30 min. $CO_2$ was gradually injected to 50 bar (over ≥15 min). During the subsequent steps, the pressure in reactor R2 was kept at 50 bar by metering in further $CO_2$. 8 g of propylene oxide were metered in with the aid of a mass flow regulator (200 g/h). The decrease in the propylene oxide concentration was monitored via IR spectroscopy. The reaction mixture was stirred (500 rpm) until the conversion of the propylene oxide was complete (about 15 min). Subsequently, two further portions each of 8 g of propylene oxide were metered in with the aid of a mass flow regulator (200 g/h) and the reaction mixture was stirred (500 rpm) in each case until the conversion of the propylene oxide was complete (about 15 min). The occurrence of a brief increase in evolution of heat in the reactor after addition of the propylene oxide confirmed the activation of the catalyst. Subsequently, the temperature of the mixture in reactor R2 was lowered to 100° C.

Subsequently, the valve at the outlet of reactor R2 was opened. $CO_2$ was introduced continuously into the gas phase of reactor R2 at a flow rate of 20 g/h. The outlet stream was led off via a further pressure vessel (reactor R3) and a supply pressure regulator. The pressure in reactors 2 and 3 was set to 50 bar by means of the supply pressure regulator. 30 g/h of propylene oxide were metered continuously into reactor R2 via a mass flow regulator. As soon as the overflow from reactor R2 (at liquid volume 175 mL) had been attained, the continuous propylene oxide stream was turned down to 14.4 g/h. At the same time, the mixture of starter compound and unactivated DMC catalyst from reactor R1 was introduced continuously into reactor R2 at a rate of 18.0 g/h and the $CO_2$ stream was regulated to a flow rate of 15 g/h. The overflow from reactor R2 was introduced into reactor R3. The product mixture was collected in reactor R3 at 100° C. under pressure and stirred at 200 rpm.

After an operating time of 24 hours, a sample of the liquid phase was taken from reactor R2 via a valve and analyzed.

Characterization of the Reaction Mixture in Reactor R2:

The IR spectroscopy analysis of the reaction mixture in reactor R2 directly before taking of the sample showed a conversion of propylene oxide of 98.5%.

The specific product output of reactor R2 was 161.0 [kg/(m$^3$·h)].

Characterization of the Reaction Mixture Withdrawn from Reactor R2 in the Steady State:

The NMR spectroscopy analysis gave a selectivity g/e of 0.08.

The molar ratio of carbonate groups to ether groups in the polyether carbonate polyol e/f was 18.40/81.60.

The polyether carbonate polyol obtained had a molecular weight $M_n$=2668 g/mol, $M_w$=2984 g/mol and a polydispersity of 1.12. The molecular weight $M_{90}$ was 4252 g/mol.

Characterization of the Product Mixture from Reactor R3 after Removal of the Volatile Constituents in a Falling-Film Evaporator:

OH number: 53.8 mg KOH/g.
Viscosity: 1.2 Pas.

TABLE 1

Overview of the results from examples 1 to 4:

| Example | 1 | 2 (comparative) | 3 | 4 (comparative) |
|---|---|---|---|---|
| Activation DMC catalyst | activated | unactivated | activated | unactivated |
| Starter compound | PET-1 | PET-1 | PET-2 | PET-2 |
| Specific product output [kg/(m³·h)] | 170.2 | 161.8 | 162.4 | 161.0 |
| Selectivity g/e | 0.11 | 0.06 | 0.17 | 0.08 |
| Selectivity e/f | 23.72/76.28 | 25.93/74.07 | 15.08/84.92 | 18.40/81.60 |
| $M_n$ [g/mol] | 3755 | 3030 | 2734 | 2668 |
| Polydispersity $M_w/M_n$ | 1.20 | 1.31 | 1.09 | 1.12 |
| $M_{90}/M_n$ | 1.83 | 2.05 | 1.54 | 1.59 |
| OH number [mg KOH/g] | 53.7 | 54.3 | 55.5 | 53.8 |
| Viscosity [Pa·s] | 5.0 | 5.7 | 0.9 | 1.2 |

A comparison of example 1 with comparative example 2 and of example 3 with comparative example 4 shows that the use of an activated catalyst leads to a higher specific product output. The analysis of the reaction mixture withdrawn at the steady state shows a narrower molar mass distribution of the polyether carbonate polyol (reduced polydispersity, lower $M_{90}/M_n$ ratio); the analysis of the product obtained shows a lower viscosity of the polyether carbonate polyol obtained with use of a catalyst activated as per step (β).

Example 5: Continuous Process for Copolymerization of Propylene Oxide and $CO_2$ Using a DMC Catalyst Activated in a Continuous Process without $CO_2$ Process Steps:

Step (α) Preparation of a Mixture of DMC Catalyst and Starter Compound (Reactor R1):

A 300 mL pressure reactor (reactor R1) equipped with an impeller stirrer was initially charged with a mixture of DMC catalyst (0.0402 g) and PET-2 (100.02 g). The reactor was closed, the pressure in the reactor was reduced to 50 mbar and the reactor was heated up to 130° C. Subsequently, a gentle Ar stream was introduced into the reaction mixture at the base of the reactor. By regulating the Ar stream and simultaneously removing the gas from the reactor with a pump, the pressure in the reactor was adjusted to 50 mbar and the mixture was stirred (500 rpm) at 130° C. under reduced pressure (50 mbar) and a gentle Ar stream for 60 min.

Step (β) (Activation) in Reactor R1:

10 g of propylene oxide were metered into the mixture from step (α) in reactor R1 with the aid of an HPLC pump (10 mL/min). The decrease in the propylene oxide concentration was monitored via IR spectroscopy. The reaction mixture was stirred (500 rpm) until the conversion of the propylene oxide was complete (about 15 min). Subsequently, two further portions each of 10 g of propylene oxide were metered in with the aid of the HPLC pump (10 mL/min) and the reaction mixture was stirred (500 rpm) in each case until the conversion of the propylene oxide was complete (about 15 min). The occurrence of a brief increase in evolution of heat in the reactor after addition of the propylene oxide confirmed the activation of the catalyst. A further 61.64 g of propylene oxide were metered in with the aid of the HPLC pump (10 mL/min).

Startup of the Continuous Homopolymerization (Reactor R1):

Subsequently, the valve at the outlet of reactor R1 was opened. Argon was introduced continuously into the gas phase of reactor R1 at a flow rate of 5 g/h. The outlet stream was led off via the copolymerization reactor (reactor R2), a further pressure vessel (reactor R3) and a supply pressure regulator. The pressure in reactors 1, 2 and 3 was set to 50 bar by means of the supply pressure regulator. 20 g/h of propylene oxide were metered continuously into reactor R1 via a mass flow regulator. At the same time, a mixture of DMC catalyst (0.3966 g) and propylene glycol (75.049 g) was introduced continuously into reactor R1 at a rate of 2.2 g/h.

Startup of the Continuous Copolymerization (Reactor R2) [Step (γ)]:

The overflow from reactor R1 was conducted continuously into the initially empty reactor R2. After 4.5 hours, 55.85 g/h of propylene oxide were metered continuously into reactor R2 via a mass flow regulator. After a further 4.0 hours, $CO_2$ was introduced continuously into the gas phase of reactor R2 at a flow rate of 50 g/h. The product mixture was collected in reactor R3 at 100° C. under pressure and stirred at 200 rpm.

Operation of the Continuous Homopolymerization (Reactor R1):

Reactor R1 continued to be stirred (500 rpm) at 130° C. Argon was introduced continuously into the gas phase of reactor R1 at a flow rate of 5 g/h. 20 g/h of propylene oxide were metered continuously into the liquid phase of reactor R1 via a mass flow regulator. At the same time, a mixture of DMC catalyst (0.4702 g) and propylene glycol (90.024 g) was introduced continuously into the liquid phase of reactor R1 at a rate of 2.2 g/h.

Operation of the Continuous Copolymerization (Reactor R2) [Step (γ)]:

Reactor R2 continued to be stirred (500 rpm) at 130° C. The overflow from reactor R1 was conducted continuously into reactor R2. $CO_2$ was introduced continuously into the gas phase of reactor R2 at a flow rate of 50 g/h. 55.85 g/h of propylene oxide were metered continuously into reactor R2 via a mass flow regulator. The product mixture was collected in reactor R3 at 100° C. under pressure and stirred at 200 rpm.

After an operating time of 10 hours, a sample of the liquid phase was taken from each of reactors 1 and 2 via a valve and analyzed.

Characterization of the Reaction Mixture from the Homopolymerization Reactor (Reactor R1):

The NMR spectroscopy analysis of the reaction mixture gave a conversion of propylene oxide of 86.0%.

Characterization of the Reaction Mixture from the Copolymerization Reactor (Reactor R2):

The NMR spectroscopy analysis of the reaction mixture gave a conversion of propylene oxide of 84.3%.

The selectivity g/e was 0.10.

The molar ratio of carbonate groups to ether groups in the polyether carbonate polyol e/f was 7.21/92.79.

The polyether carbonate polyol obtained had a molecular weight $M_n$=2386 g/mol, $M_w$=5157 g/mol and a polydispersity of 2.16.

OH number of the mixture obtained: 47.0 mg KOH/g.

Example 5 shows that the DMC catalyst can be activated in a continuous homopolymerization and can be used in a subsequent continuous copolymerization. A particularly high specific product output of the copolymerization reactor of 376 kg/(m$^3$·h) was achieved.

The invention claimed is:

1. A process for preparing polyether carbonate polyols, comprising reacting alkylene oxide with carbon dioxide in the presence of an H-functional starter compound and double metal cyanide catalyst, wherein the process comprises:
   ($\alpha$) optionally, pretreating a double metal cyanide catalyst (DMC catalyst) at a temperature of 50 to 200° C. and/or reduced pressure (absolute) of 10 mbar to 800 mbar in a first reactor,
   ($\beta$) contacting the double metal cyanide catalyst and suspension medium with alkylene oxide to obtain a first reaction mixture in a first reactor; and
   ($\gamma$) continuously adding the first reaction mixture, alkylene oxide, carbon dioxide and optionally H-functional starter compound to a second reactor,
   wherein at least one H-functional starter compound is added at least in one of steps ($\beta$) and ($\gamma$) and
   wherein reaction products formed in step ($\gamma$) are withdrawn continuously from the second reactor.

2. The process as claimed in claim 1, wherein ($\beta$) additionally comprises contacting the double metal cyanide catalyst with carbon dioxide.

3. The process as claimed in claim 1, wherein ($\beta$) comprises at least intermittently metering double metal cyanide catalyst, alkylene oxide, suspension medium and/or H-functional starter compound into the first reactor in a continuous manner.

4. The process as claimed in claim 1, wherein ($\beta$) and/or ($\gamma$) comprises introducing carbon dioxide gas into the mixture by:
   (i) sparging the reaction mixture in the reactor from below through an inlet tube or a sparging ring with guiding of the carbon dioxide gas beneath a stirrer blade; or
   (ii) stirring the reaction mixture with a hollow shaft stirrer; or
   (iii) combining: (A) sparging the reaction mixture in the reactor from below through an inlet tube or a sparging ring with guiding of the carbon dioxide gas beneath the stirrer blade with (B) stirring the reaction mixture with a hollow shaft stirrer in a manner such that the introduction of the gas from below is effected beneath the hollow shaft stirrer; or
   (iv) sparging via a liquid surface by a stirrer system with a multilevel design or by a stirrer system which acts at the liquid surface; or
   (v) a combination of (i) and (iv), a combination of (ii) and (iv), or a combination of (iii) and (iv).

5. The process as claimed in claim 1, wherein the sum total of the mass flow rates introduced into the second reactor is equal to the sum total of the mass flow rates discharged from the second reactor.

6. The process as claimed in claim 1, wherein the ratio of the mass flow rate at which the first reaction mixture is metered into the second reactor to the mass flow rate at which alkylene oxide is metered into the second reactor ranges from $\geq 0.001$ to $\leq 10$.

7. The process as claimed in claim 1, wherein the first reactor and/or the second reactor is a backmixed reactor.

8. The process as claimed in claim 1, wherein a portion of the product obtained after ($\gamma$) is recycled into the first and/or second reactor.

9. The process as claimed in claim 1, wherein the alkylene oxide used is ethylene oxide and/or propylene oxide.

10. The process as claimed in claim 1, wherein the H-functional starter compound comprises at least one compound selected from the group consisting of alcohols, amines, thiols, amino alcohols, thio alcohols, hydroxy esters, polyether polyols, polyester polyols, polyester ether polyols, polycarbonate polyols, polyether carbonate polyols, polyethyleneimines, polyetheramines, polytetrahydrofurans, polyether thiols, polyacrylate polyols, castor oil, the mono- or diglyceride of ricinoleic acid, monoglycerides of fatty acids, chemically modified mono-, di- and/or triglycerides of fatty acids and $C_1$-$C_{24}$-alkyl fatty acid esters containing an average of at least 2 OH groups per molecule.

11. The process as claimed in claim 1, wherein the double metal cyanide catalyst comprises at least one compound selected from the group of zinc hexacyanocobaltate(III), zinc hexacyanoiridate(III), zinc hexacyanoferrate(III) and cobalt(II) hexacyanocobaltate(III).

12. The process as claimed in claim 1, wherein ($\beta$) and/or ($\gamma$) are conducted at a pressure in the range of $\geq 10$ mbar to $\leq 100$ bar.

13. The process as claimed in claim 1, wherein the process comprises:
   ($\alpha$) pretreating the double metal cyanide catalyst at a temperature of 50 to 200° C. and/or reduced pressure (absolute) of 10 mbar to 800 mbar,
   which comprises
   ($\alpha$1) initially charging the first reactor with the DMC catalyst and H-functional starter compound,
   ($\alpha$2) passing an inert gas, an inert gas-carbon dioxide mixture or carbon dioxide through the first reactor at a temperature of 50 to 200° C. and, at the same time, establishing a reduced pressure (in absolute terms) of 10 mbar to 800 mbar in the first reactor by removing the inert gas or carbon dioxide.

14. The process as claimed in claim 1, wherein ($\alpha$) additionally comprises continuously metering DMC catalyst and H-functional starter compound into the first reactor.

15. The process as claimed in claim 1, wherein, in ($\beta$), the suspension medium comprises at least one H-functional starter compound selected from the group consisting of polyether polyols, polycarbonate polyols, polyester carbonate polyols, polyether ester carbonate polyols and polyether carbonate polyols, wherein these H-functional starter compounds each have a hydroxyl number in the range from 3.0 mg KOH/g to 1000 mg KOH/g.

* * * * *